United States Patent Office 2,798,829
Patented July 9, 1957

2,798,829

PROCESS FOR ENHANCING THE CORROSION RESISTANCE OF CERTAIN COATED ALUMINUM SURFACES

Nelson J. Newhard, Jr., Oreland, and John A. Carroll, Philadelphia, Pa., assignors to American Chemical Paint Company, Ambler, Pa., a corporation of Delaware No Drawing. Application August 4, 1953,
Serial No. 372,386

3 Claims. (Cl. 148—6.2)

This invention relates to the art of coating aluminum and alloys thereof in which aluminum is the principal ingredient and in the following disclosure, as well as in the appended claims, the word "aluminum" is intended to be understood as including alloys thereof in which aluminum is the principal or dominant ingredient.

It has been known to those skilled in this art that aluminum surfaces can be improved as to their corrosion resistance and paint holding ability if they are coated by subjecting them to the action of an acid aqueous solution, the essential coating-producing ingredients of which are soluble fluorides, dichromates, and acids from the class consisting of phosphoric and arsenic acids. Coating treatments of this kind are fully described and claimed in U. S. Patents 2,438,877; 2,471,909; 2,494,910; 2,472,864, etc. and are now well known to those skilled in this art. In the several disclosures just mentioned, various materials and methods are described for the coating of aluminum by treating it with an acid aqueous solution of the nature above specified. All of these processes produce on aluminum a coating which apparently is amorphous in nature and consists principally of phosphates.

The present invention stems from the discovery that aluminum surfaces which are so coated may have their resistance to corrosion substantially improved if the coated surfaces are subsequently treated with certain aqueous solutions to be described below and the principal object of the present invention is to so improve such coated aluminum.

By way of examples of coatings produced by previous methods upon which coatings the present invention is particularly useful, we wish to cite the following. For example, a coating may be produced by means of a solution which is formulated in accordance with:

*Formula No. I*

| | Grams |
|---|---|
| Sodium fluoride | 5 |
| Chromic acid (CrO₃) | 10 |
| Phosphoric acid, 75% | 64 |
| Water, to make 1 liter. | |

A coating may be obtained by immersing the aluminum surface in the foregoing solution or by flowing or spraying the solution upon the work or by any other convenient technique familiar to the art in which the solution is brought into contact with all portions of the surface of the metal and allowed to act thereon until the coating is produced. The time required to produce the coating will vary, of course, with the temperature. At ordinary living temperatures (70 to 80° F.) it may require as much as five to ten minutes to produce an appreciable coating with the above solution but this time can be substantially reduced, say, to as little as one or two minutes or even less by suitably heating the solution. If the period of contact between the solution and the surface is relatively short, after which an adhering film of solution is to be permitted to act for some time, it may be desirable to use a solution which is considerably more concentrated than that given in the above formula.

Other representative formulae for various coating solutions of the nature disclosed in the above referred to patents are as follows:

*Formula No. II*

| | Grams |
|---|---|
| Phosphoric acid, 75% | 64 |
| Sodium fluoride | 1.34 |
| Chromic acid (CrO₃) | 10 |
| Sodium chloride | 1 |
| Water, to make 1 liter. | |

*Formula No. III*

| | Grams |
|---|---|
| Sodium fluoride | 5 |
| Chromic acid (CrO₃) | 10 |
| Phosphoric acid, 75% | 61 |
| Arsenic acid | 2 |
| Water, to make 1 liter. | |

*Formula No. IV*

| | Grams |
|---|---|
| Sodium fluoride | 5.0 |
| Chromic acid | 10.0 |
| Arsenic acid | 92.5 |
| Water, to make 1 liter. | |

After treatment with any of the typical solutions described above or with other coating solutions of a similar nature, the coated surface must be rinsed with water or it may be rinsed with a diluted, acidulated solution of chromic and/or phosphoric acid. After this rinse, the coated surface, either wet or dry, is treated with a solution of chromic acid and a fluorine bearing compound. By the term "fluorine bearing compound" we mean hydrofluoric acid and its salts such as sodium fluoride, ammonium bifluoride, potassium fluoride, etc.

The chromic acid concentration of this treating solution should be between 1 and 10 grams per liter and preferably between 2 and 4 grams per liter. At a chromic acid concentration of less than 1 gram per liter, very little enhanced corrosion resistance is obtained. At concentrations of chromic acid greater than 10 grams per liter, the treated surfaces are apt to have a marked stained appearance due to the concentration of chromic acid. At concentrations between 2 and 4 grams per liter of chromic acid, maximum corrosion resistance with little or no staining is obtained.

The fluorine must be present in an amount from 0.010 to 2.0 grams per liter and preferably between 0.03 and 0.50 gram per liter. For each gram of chromic acid present in the bath, the bath should have from 0.01 to 0.20 gram per liter of fluorine and preferably the fluorine should be between 0.05 and 0.15 gram per liter for each gram of chromic acid (CrO₃) used. If the concentration of fluorine in relation to chromic acid exceeds the maximum limits, there is a tendency for the coating to be stripped and the corrosion resistance drops off. Conversely, if the concentration of fluorine to chromic acid is below the limits just stated, there is very little, if any, enhanced corrosion resistance obtained.

The pH of the treating solution is also important. The chromic acid and fluorine bearing compound must be present in the solution in such proportions and amounts so that the pH of the solution is between 1.6 and 2.8 and preferably between 1.8 and 2.0. At pH's below 1.6, there is a tendency for the previously formed coating to be stripped from the aluminum surface. At a pH greater than 2.8, very little enhanced corrosion resistance is imparted to the surface. For optimum results, the pH should be between 1.8 and 2.0.

The treating solutions are useful over a wide range of temperatures. For dilute treating solutions, we prefer relatively high temperatures, i. e. 150° F. However, we are not limited to any specific range of temperature.

The duration of treating time is not particularly important so long as the rinsed coated aluminum surface is subjected to the action of the treating solution. We have found that treating times of only a few seconds duration have been sufficient to enhance the corrosion resistance of the coated aluminum surface.

Within the teachings just given, suitable treating solutions may be prepared in accordance with the following formulae:

*Formula No. V*

|   | Grams |
|---|---|
| 48% hydrofluoric acid solution | .076 |
| Chromic acid | 4 |
| Water, to make 1 liter. | |

*Formula No. VI*

|   | Grams |
|---|---|
| Chromic acid | 2.0 |
| Ammonium bifluoride (NH₄FHF) | 0.045 |
| Water, to make 1 liter. | |

In conclusion we wish to point out that our invention contemplates a multi-step procedure for producing a highly corrosion resistant surface on aluminum, which procedure involves coating the aluminum by subjecting it to the action of an acid aqueous solution, the essential coating-producing ingredients of which are soluble fluorides, dichromates and acids from the class consisting of phosphoric and arsenic acids, then rinsing the coating so produced and afterwards subjecting the rinsed surface to the action of an acid aqueous solution of the character disclosed above and claimed below.

We claim:

1. In the art of coating aluminum by subjecting it to the action of an acid aqueous solution, the essential coating producing ingredients of which are fluoride ions, dichromate ions, and ions from the class of acids consisting of phosphoric and arsenic acids; the method which includes treating a surface so coated with an acid aqueous solution containing, as its essential active material, a mixture of chromic acid and a fluorine bearing compound from the class consisting of hydrofluoric acid, sodium fluoride, ammonium bifluoride and potassium fluoride; the concentration of the chromic acid being from 1 to 10 grams per liter and of the fluorine from the fluorine bearing compound from 0.01 to 2.0 grams per liter and the pH of the solution from 1.6 and 2.8.

2. The method of claim 1 wherein the concentration of the chromic acid is from 2 to 4 grams per liter and that of the fluorine from the fluorine bearing compound from 0.03 to 0.50 gram per liter.

3. The method of claim 1 wherein the concentration of the chromic acid is from 2 to 4 grams per liter and that of the fluorine from the fluorine bearing compound from 0.03 to 0.50 gram per liter and the pH of the solution from 1.8 to 2.0.

References Cited in the file of this patent

UNITED STATES PATENTS

| 2,269,435 | Buzzard | Jan. 13, 1942 |
| 2,428,749 | De Long | Oct. 7, 1948 |
| 2,487,137 | Hoover et al. | Nov. 8, 1949 |
| 2,507,956 | Bruno et al. | May 16, 1950 |
| 2,563,430 | Spruance | Aug. 7, 1951 |
| 2,563,431 | Spruance | Aug. 7, 1951 |
| 2,568,936 | Spruance | Sept. 25, 1951 |

OTHER REFERENCES

De Long: Abstract of Serial No. 725,750, published August 30, 1949.